US011140299B2

(12) United States Patent
Arai et al.

(10) Patent No.: US 11,140,299 B2
(45) Date of Patent: Oct. 5, 2021

(54) IMAGE PROCESSING APPARATUS, IMAGE FORMING SYSTEM, AND NON-TRANSITORY COMPUTER READABLE MEDIUM STORING PROGRAM

(71) Applicant: FUJIFILM Business Innovation Corp., Tokyo (JP)

(72) Inventors: Noriko Arai, Kanagawa (JP); Shinji Hanaoka, Kanagawa (JP); Chihiro Matsuguma, Kanagawa (JP); Tatsuya Namiki, Kanagawa (JP); Yurie Ishikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 197 days.

(21) Appl. No.: 16/211,249

(22) Filed: Dec. 6, 2018

(65) Prior Publication Data

US 2019/0246010 A1 Aug. 8, 2019

(30) Foreign Application Priority Data

Feb. 8, 2018 (JP) .............................. JP2018-020857

(51) Int. Cl.
*H04N 1/60* (2006.01)
*H04N 1/32* (2006.01)

(52) U.S. Cl.
CPC ....... *H04N 1/6027* (2013.01); *H04N 1/32368* (2013.01); *H04N 1/32475* (2013.01); *H04N 1/6008* (2013.01)

(58) Field of Classification Search
None
See application file for complete search history.

(56) References Cited

U.S. PATENT DOCUMENTS

2008/0278736 A1* 11/2008 Kawashima .......... G06F 3/1211
358/1.9
2011/0316911 A1* 12/2011 Ishikawa .............. G06K 15/107
347/9

FOREIGN PATENT DOCUMENTS

JP 4398567 1/2010

* cited by examiner

*Primary Examiner* — Lennin R Rodriguezgonazalez
(74) *Attorney, Agent, or Firm* — JCIPRNET (57) ABSTRACT

An image processing apparatus includes: a gradation correction section that performs output gradation correction with respect to input multi-value image data; a conversion section that converts the multi-value image data, which is acquired after the output gradation correction is performed by the gradation correction section, into binary image data; a storage section that stores the multi-value image data or the binary image data; and a control section that performs control such that the multi-value image data, which is acquired before the output gradation correction is performed, is stored in the storage section in a case where content of the input image data is content which requires the output gradation correction, and such that the binary image data is stored in the storage section in a case where the content of the input image data is content which does not require the output gradation correction.

9 Claims, 9 Drawing Sheets

FIG. 2

FIG. 3
EXAMPLE OF OUTPUT GRADATION PROPERTY OF PRINTER 40

(A)

FIG. 4
EXAMPLE OF OUTPUT GRADATION CORRECTION DATA (B)

SECOND PROCESS EXAMPLE OF
CASE WHERE IMAGE DATA IS STORED

IMAGE PROCESSING APPARATUS, IMAGE FORMING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-020857 filed Feb. 8, 2018.

BACKGROUND

(i) Technical Field

The present invention relates to an image processing apparatus, an image forming system, and a non-transitory computer readable medium storing a program.

(ii) Related Art

JP4398567B discloses an image processing system, in which an image processing unit that performs a process with respect to image data read by an image reading apparatus, such as a scanner, a storage device that stores the image-processed image data, and a plurality of output devices that perform print output of the image data read by the image reading apparatus are connected to a network. The image processing system stores the image data in a data format, such as YMCK multi-value data, which is capable of corresponding to a property of each of the output devices in a case where the image data is stored in the storage device, and performs output by converting the image data into image data suitable for the property of the output device to which the print output is performed in a case where the print output is performed to the output devices.

SUMMARY

Aspects of non-limiting embodiments of the present disclosure relate to an image processing apparatus, an image forming system, and a non-transitory computer readable medium storing a program, which temporarily store input image data, and compare with a case where whole input image data is stored as multi-value image data in a case where an output instruction is provided, the stored image data is transmitted to an output device, and an output process is performed, thereby being capable of reducing time from when an output of the stored image data is instructed until the output process starts.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including: a gradation correction section that performs output gradation correction with respect to input multi-value image data; a conversion section that converts the multi-value image data, which is acquired after the output gradation correction is performed by the gradation correction section, into binary image data; a storage section that stores the multi-value image data or the binary image data; and a control section that performs control such that the multi-value image data, which is acquired before the output gradation correction is performed, is stored in the storage section in a case where content of the input image data is content which requires the output gradation correction, and such that the binary image data is stored in the storage section in a case where the content of the input image data is content which does not require the output gradation correction.

BRIEF DESCRIPTION OF THE DRAWINGS

Exemplary embodiment(s) of the present invention will be described in detail based on the following figures, wherein.

DETAILED DESCRIPTION

Subsequently, an exemplary embodiment of the present invention will be described in detail with reference to the accompanying drawings.

Figure 1:
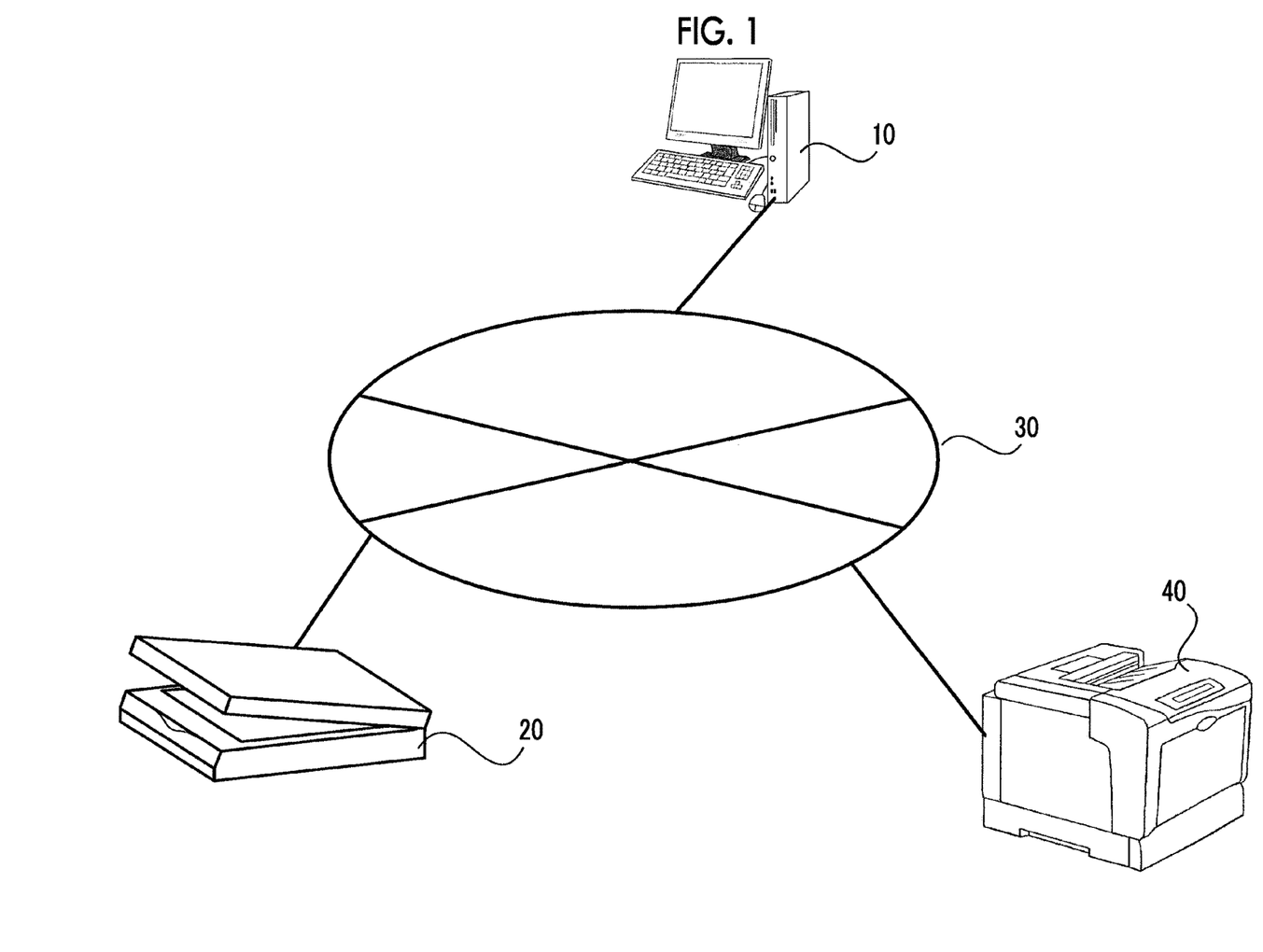
FIG. 1 is a diagram illustrating a system configuration of an image forming system according to an exemplary embodiment of the present invention.

FIG. 1 is a diagram illustrating a configuration of an image forming system according to the exemplary embodiment of the present invention.

The image forming system according to the exemplary embodiment of the present invention is configured to include a terminal apparatus 10, such as a personal computer, a scanner 20, and a printer 40, which are connected to each other via a network 30, as illustrated in FIG. 1.

In the description below, a case where a process, so-called network copying, for realizing a copying process using a plurality of apparatuses, which are connected via the network, is performed using the image forming system according to the exemplary embodiment will be described.

The scanner 20 is a reading device used to perform a process for conversion into image data by performing a process for reading a set manuscript. The terminal apparatus 10 performs a function as a print server and functions as an image processing apparatus which temporarily stores the image data read by the scanner 20, performs a color conversion process, an output gradation correction process, and a screen process with respect to the image data, and performs a process for transmitting results of the processes as print data to the printer 40. The printer 40 is an output device which receives the print data transmitted from the terminal apparatus 10 and outputs an image on paper according to the print data.

Subsequently, an overview of processes, which are respectively performed by the scanner 20, the terminal apparatus 10, and the printer 40 in a case where the network copying as described above is performed, will be described with reference to FIG. 2.

Figure 2:
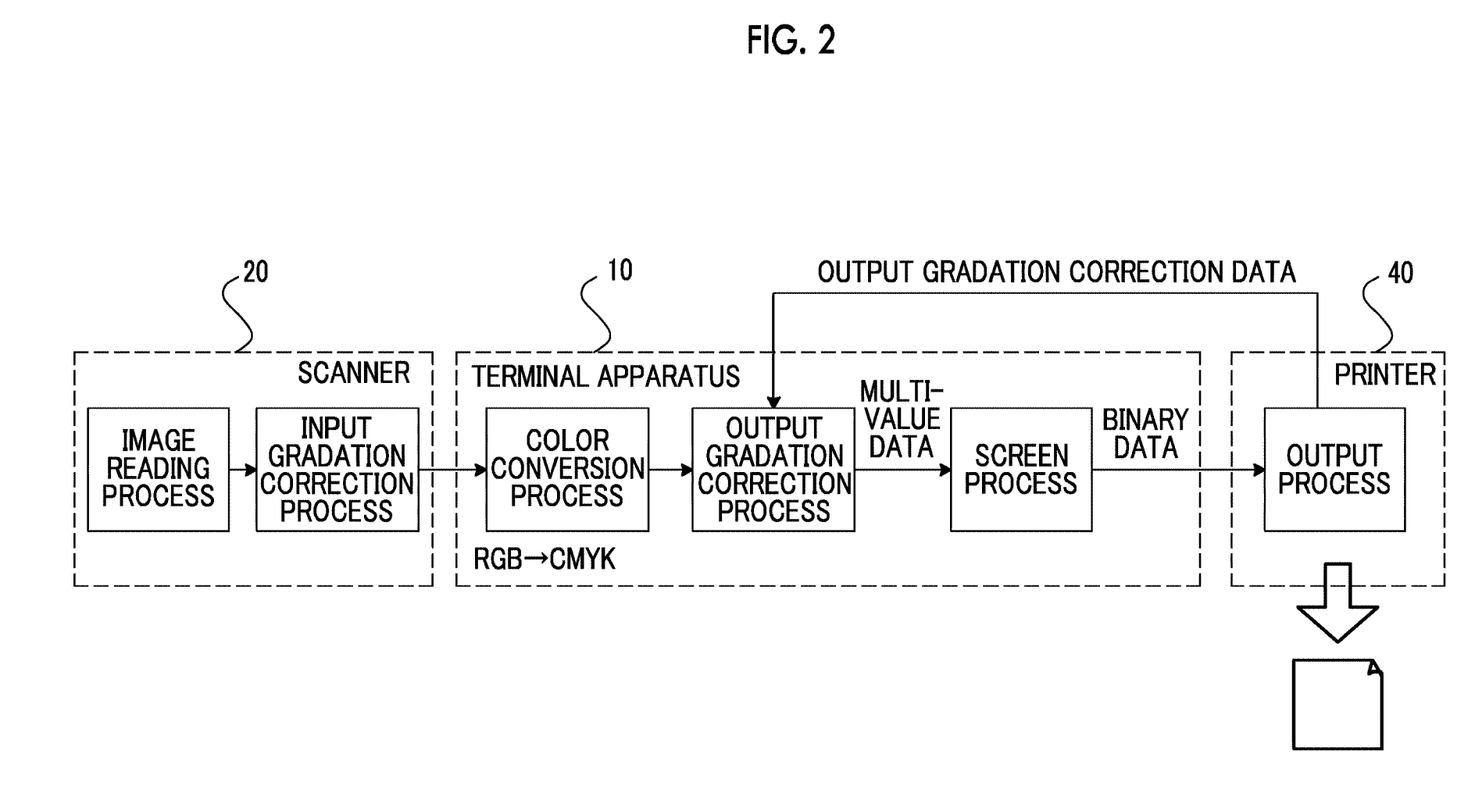
FIG. 2 is a diagram illustrating an overview of processes which are respectively performed by a scanner 20, a terminal apparatus 10, and a printer 40 in a case where network copying is performed.

First, as illustrated in FIG. 2, the manuscript image reading process is performed in the scanner 20, and an input gradation correction process is performed with respect to the read image data. The input gradation correction process is a process for performing gradation correction in order to compensate for a variation in a gradation property of an image reading device of the scanner 20. That is, the input gradation correction process is a gradation correction process for returning the varied gradation property to a targeting gradation property in a case where the gradation property varies in the image reading device due to secular change, temperature change, or the like.

Furthermore, the image data, which is read by the scanner 20, is transmitted to the terminal apparatus 10 via the network 30. Furthermore, in the terminal apparatus 10, the color conversion process from an RGB color space to a CMYK color space is performed with respect to the image data transmitted from the scanner 20. Here, the image data, which is acquired after the color conversion process is performed, becomes the multi-value image data in a CMYK format in which, for example, each pixel is realized by total 32 bits including 8 bits for each of four CMYK colors. Furthermore, the output gradation correction process is performed with respect to the multi-value image data in the CMYK format which is acquired by performing the color conversion process.

The output gradation correction process is a process for performing gradation correction in order to compensate for the variation in a gradation property of the printer 40 which is the output device. That is, in the same manner as in the input gradation correction process, the output gradation correction process is the gradation correction process for returning the varied gradation property to the targeting gradation property in a case where the gradation property varies in the printer 40 due to the secular change, the temperature change, or the like.

Furthermore, in the output gradation correction process, output gradation correction data (process control data), which is used to correct a current output gradation property of the printer 40 to be the targeting gradation property, is transmitted from the printer 40 to the terminal apparatus 10. In the terminal apparatus 10, the output gradation correction process is performed using the transmitted gradation correction data.

Figure 3:
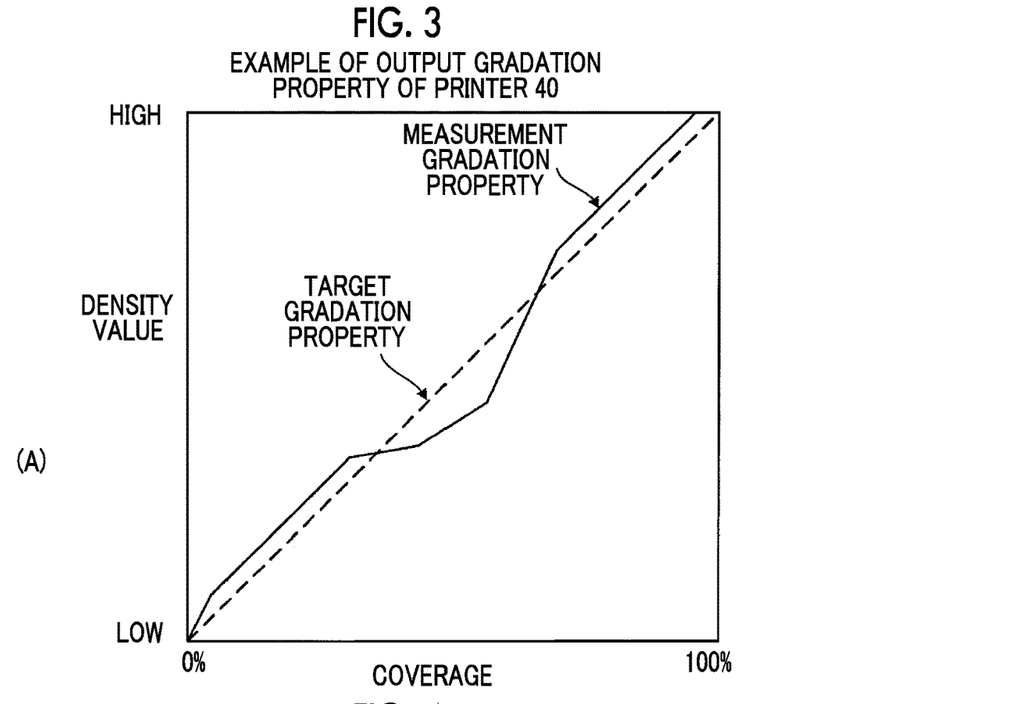
FIG. 3 is a graph illustrating an example of an output gradation property of the printer 40.

A detailed example of the output gradation correction process will be described with reference to FIGS. 3 and 4.

For example, a measurement gradation property, which is acquired in a case where the output gradation property of the printer 40 is measured, will be described with reference to FIG. 3. In FIG. 3, it is understood that the current output gradation property of the printer 40 is deviated from an ideal target gradation property.

Figure 4:
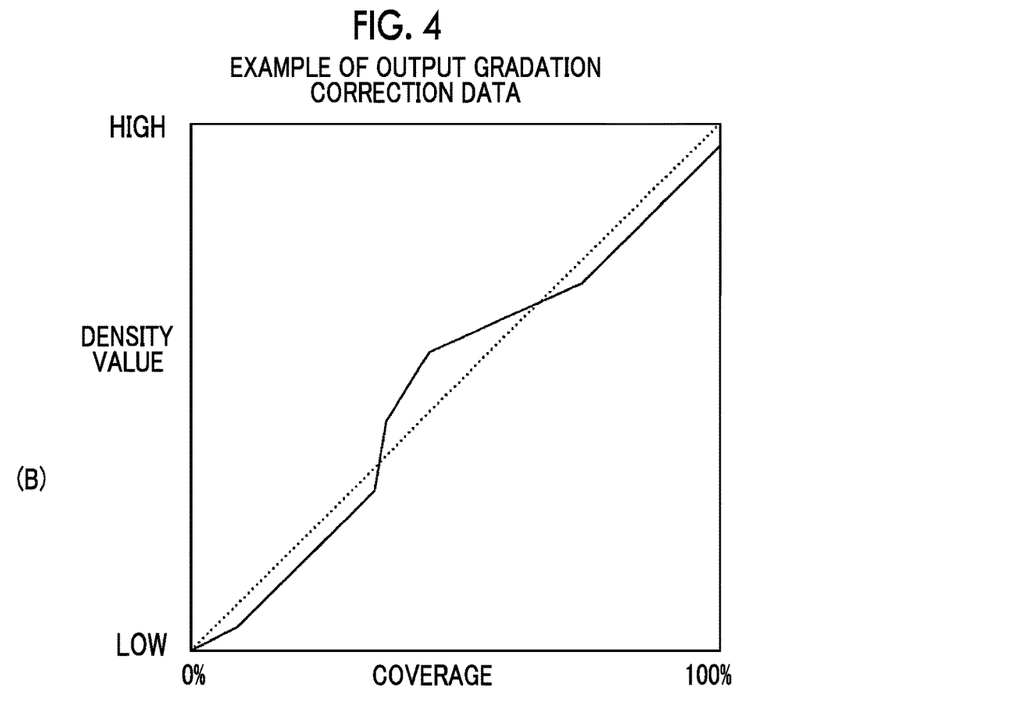
FIG. 4 is a graph illustrating an example of output gradation correction data.

Therefore, data as illustrated in FIG. 4 is generated as the output gradation correction data used to perform output gradation correction for compensating for a gradation variation in the printer 40, that is, a deviation of an actual output gradation property from the target gradation property. The output gradation correction data illustrated in FIG. 4 is data which is used to correct a half-tone gradation variation instead of correcting a maximum density variation for the most part.

Meanwhile, the gradation property of the printer 40 changes due to the elapse of time, the number of printed paper sheets, or the like. Therefore, for example, the output gradation correction data as illustrated in FIG. 4 is periodically generated according to a set condition, such as each time in which a printing process corresponding to 100 sheets is performed or each time in which previously set time elapses, in a case where power of the printer 40 is supplied.

Furthermore, in the terminal apparatus 10, the output gradation correction process is performed based on the gradation correction data which is generated as described above.

Subsequently, the screen process is performed with respect to the multi-value image data in the CMYK format acquired after the output gradation correction process is performed, the multi-value image data is converted into binary image data in the CMYK format, and the binary image data is transmitted to the printer 40 as the print data.

Furthermore, in the printer 40, the printing process is performed by forming an image on printing paper based on the binary image data in the CMYK format.

Here, a reason that the image data, which is transmitted from the terminal apparatus 10 to the printer 40, becomes the binary image data is that transmission time becomes long in a case where the multi-value image data is transmitted from the terminal apparatus 10 to the printer 40. Therefore, the screen process for converting the multi-value image data into the binary image data is configured to be performed in the terminal apparatus 10 such that the binary image data is transmitted to the printer 40.

However, it is necessary to perform the above-described output gradation correction process with respect to the multi-value image data. Therefore, in a case where the screen process is performed in the terminal apparatus 10, it is necessary to feedback the output gradation correction data from the printer 40 to the terminal apparatus 10, as described above.

Furthermore, in the network copying, there is a case where, after the image data which is read in the scanner 20 is temporarily stored in the terminal apparatus 10, the image data is transmitted to the printer 40 since a certain amount of time elapses, and the output process is performed without successively performing a process for reading a manuscript and a process for outputting the manuscript on the printing paper.

However, as described above, the output gradation property of the printer 40 normally varies due to the elapse of time, the number of printed paper sheets, or the like, and thus it is necessary to perform the output gradation correction process immediately before the output process is performed.

Furthermore, it is necessary that the image data is the multi-value image data in order to perform the output gradation correction process. Therefore, even in a case where the image data is stored in the terminal apparatus 10, it is necessary to store the image data in a multi-value state which is acquired before the screen process is performed.

However, in a case where an output instruction with respect to the stored multi-value image data is provided, the stored multi-value image data is read, the output gradation correction process is performed by acquiring the output gradation correction data from the printer 40, and, further, conversion into the binary image data is performed by performing the screen process and the binary image data is transmitted to the printer 40. In this case, time, which is taken from provision of the instruction to output the stored image data to start of the output process, may become long.

In an image forming apparatus, so-called a multifunction printer, in which the scanner, the output device, and the like are built in one apparatus, the image processing is performed using Application Specific IC (ASIC). Therefore, it is possible to perform the image processing at a rapid processing speed.

However, in a case where the image processing is performed by the terminal apparatus 10, such as a personal computer, which is a general-purpose apparatus, as in the network copying according to the exemplary embodiment, the image processing, such as the gradation correction process or the screen process, is performed through software processing, and thus the processing speed becomes slow and the processing time becomes long, compared to the case where the processing is performed using the ASIC.

Meanwhile, even in the terminal apparatus 10, it is possible to cause the processing speed to be rapid in a case where the image processing as described above is performed using a Graphics Processing Unit (GPU). However, costs increase, and thus the case is not realistic.

Figure 5:
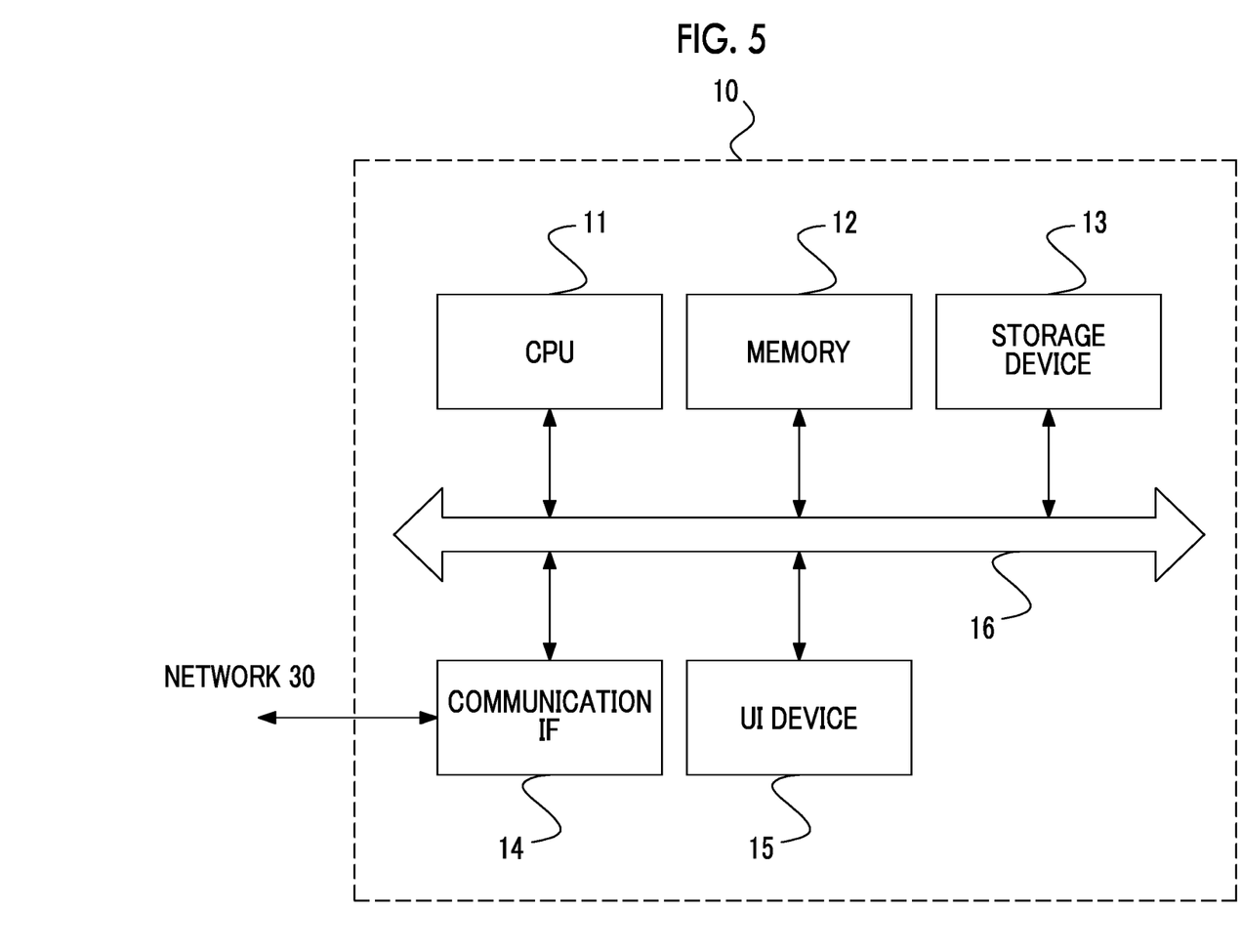
FIG. 5 is a block diagram illustrating a hardware configuration of the terminal apparatus 10 according to the exemplary embodiment of the present invention.

Subsequently, FIG. 5 illustrates a hardware configuration of the terminal apparatus 10 in the image forming system according to the exemplary embodiment.

As illustrated in FIG. 5, the terminal apparatus 10 includes a CPU 11, a memory 12, a storage device 13, such as a Hard Disk Drive (HDD), a communication interface (IF) 14 which transmits and receives data to and from an external apparatus or the like via the network 30, and a user interface (UI) device 15 which includes a touch panel, a liquid crystal display, and a keyboard. The components are connected to each other via a control bus 16.

The CPU 11 performs a predetermined process based on a control program stored in the memory 12 or the storage device 13, and controls an operation of the terminal apparatus 10. Meanwhile, although description is performed such that the CPU 11 reads and executes the control program stored in the memory 12 or the storage device 13 in the exemplary embodiment, it is possible to store the control program in a storage medium, such as a CD-ROM, and to provide the control program to the CPU 11.

Figure 6:
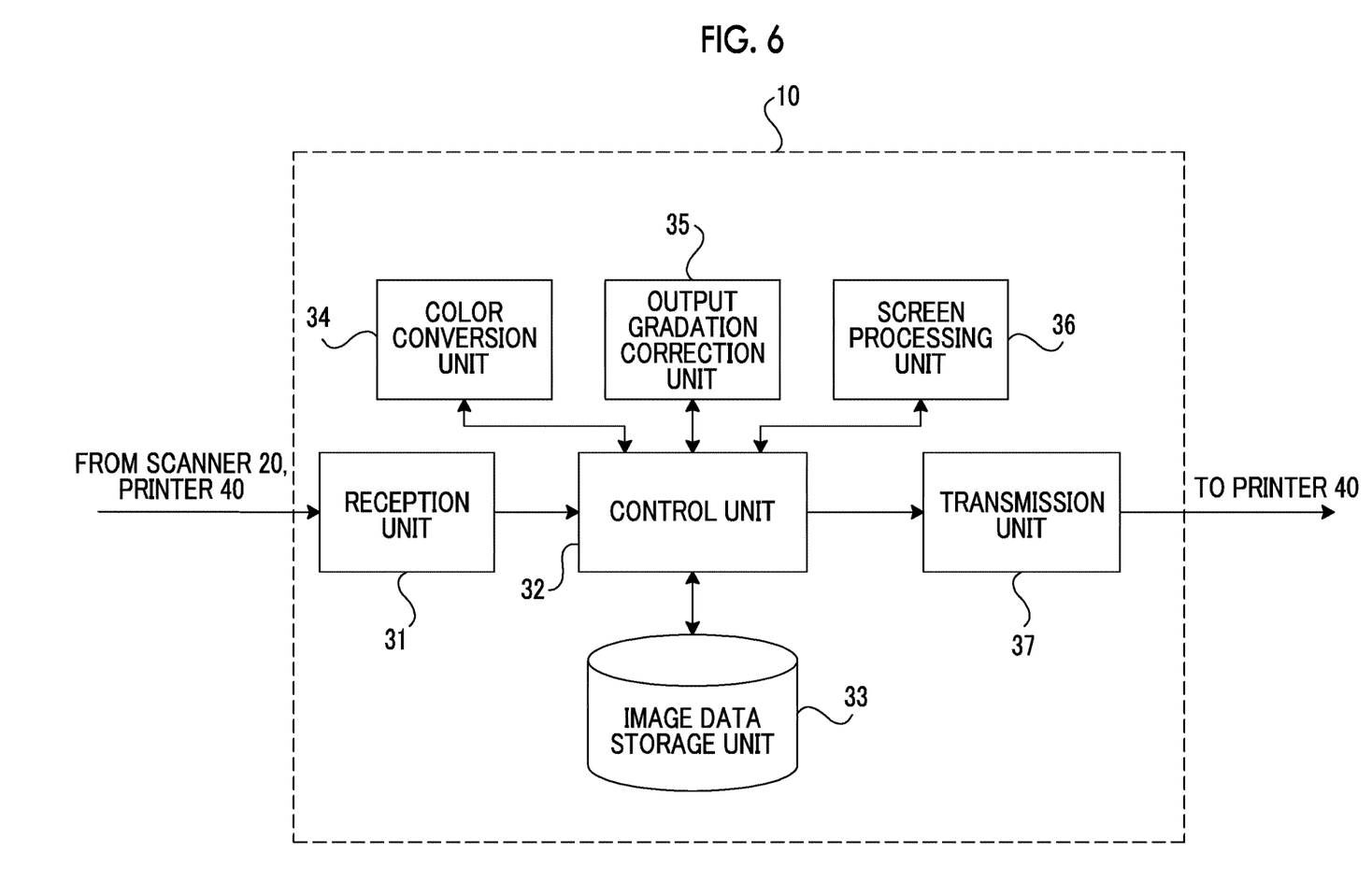
FIG. 6 is a block diagram illustrating a functional configuration of the terminal apparatus 10 according to the exemplary embodiment of the present invention.

FIG. 6 is a block diagram illustrating a functional configuration of the terminal apparatus 10 which is realized in a case where the control program is executed.

As illustrated in FIG. 6, the terminal apparatus 10 according to the exemplary embodiment includes a reception unit 31, a control unit 32, an image data storage unit 33, a color conversion unit 34, an output gradation correction unit 35, a screen processing unit 36, and a transmission unit 37.

The reception unit 31 receives manuscript image data, which is read in the scanner 20, and the output gradation correction data from the printer 40 via the network 30.

The color conversion unit 34 performs the color conversion process for converting the image data in a multi-value RGB format, which is received in the reception unit 31, into image data in a multi-value CMYK format under the control of the control unit 32.

The output gradation correction unit 35 inputs the image data in the multi-value CMYK format, which is acquired after the color conversion process is performed by the color conversion unit 34, and performs the output gradation correction with respect to the input image data in the multi-value CMYK format under the control of the control unit 32.

The screen processing unit 36 performs the screen process for converting the image data in the multi-value CMYK format, which is acquired after the output gradation correction is performed by the output gradation correction unit 35, into the binary image data under the control of the control unit 32.

The image data storage unit 33 stores the image data in the multi-value CMYK format, which is acquired after the color conversion process is performed by the color conversion unit 34, or the image data in the binary CMYK format, which is acquired after the screen process is performed by the screen processing unit 36, under the control of the control unit 32.

The transmission unit 37 transmits the image data in the binary CMYK format, which is acquired after the screen process is performed by the screen processing unit 36, to the printer 40.

The control unit 32 performs control such that the image data in the multi-value CMYK format, on which the color conversion process is performed by the color conversion unit 34 and which is acquired before the output gradation correction is performed, is stored in the image data storage unit 33 in a case where content of the image data, which is input from the scanner 20, is content which requires the output gradation correction, and performs control such that the image data in the binary CMYK format, which is acquired after the screen process is performed by the screen processing unit 36, is stored in the image data storage unit 33 in a case where the content of the image data, which is input from the scanner 20, is content which does not require the output gradation correction.

Here, in either case where the multi-value image data or the binary image data is stored in the image data storage unit 33, the control unit 32 performs a compression process with respect to the image data desired to be stored, and stores the multi-value image data, which is acquired after the compression process is performed, or the binary image data, which is acquired after the compression process is performed, in the image data storage unit 33.

Furthermore, in a case where the output instruction with respect to the image data stored in the image data storage unit 33 is provided, the control unit 32 performs control such that the image data, for which the output instruction is provided, is read and the printing process is performed in the printer 40.

Specifically, in a case where the image data, which is read from the image data storage unit 33, is the image data in the multi-value CMYK format which is acquired before the output gradation correction is performed, the control unit 32 acquires the output gradation correction data from the printer 40, and causes the output gradation correction unit 35 to perform the output gradation correction with respect to the read image data. Thereafter, the control unit 32 causes the screen processing unit 36 to perform the screen process with respect to the image data in the multi-value CMYK format, which is acquired after the output gradation correction is performed, in order to perform conversion into the image data in the binary CMYK format, and performs the printing process by transmitting the image data in the binary CMYK format from the transmission unit 37 to the printer 40.

In addition, in a case where the image data, which is read from the image data storage unit 33, is the image data in the binary CMYK format which is acquired after the screen process is performed, the control unit 32 transmits the read image data from the transmission unit 37 to the printer 40 without change, and performs the printing process.

As described above, in the terminal apparatus 10 according to the exemplary embodiment, the control unit 32 switches whether to store the image data in the multi-value CMYK format, on which only the color conversion process is performed and which is acquired before the output gradation correction is performed, as it is in the image data storage unit 33 or to store the image data in the binary CMYK format, which is acquired after the screen process is performed, in the image data storage unit 33 based on whether or not the content of the image data (image content), which is transmitted from the scanner 20, is the content which requires the output gradation correction.

Meanwhile, here, with regard to determination reference used to determine whether or not the content of the image data is the content which requires the output gradation correction, it is possible to set, as the determination reference, a fact of whether an output result, which is output from the printer 40, is largely influenced by the gradation variation in the printer 40 even though the output gradation correction is not performed or is little influenced. That is, it is possible to set, as the determination reference, a fact of whether or not it is possible to make distinction by the user who views an output result of the printer 40 through comparison of cases where the output gradation correction is performed and the output gradation correction is not performed.

Specifically, the control unit 32 determines whether or not the content of the image data, which is transmitted from the scanner 20, is the content, which requires the output gradation correction, using the following process, and switches between the formats of the image data which is acquired in a case of being stored in the image data storage unit 33.

For example, in a case where a ratio of a half-tone area (an area expressed by half-tone dots) to the input image data is smaller than a previously set ratio, the control unit 32 determines that the content of the image data is the content which requires the output gradation correction, and performs control such that the image data in the binary CMYK format is stored in the image data storage unit 33.

In addition, in a case where a ratio of a text area to the input image data is larger than the predetermined ratio, the control unit 32 determines that the content of the image data is the content which does not require the output gradation correction, and performs control such that the image data in the binary CMYK format is stored in the image data storage unit 33.

In addition, in a case where the content of the input image data is blank, the control unit 32 determines that the content of the image data is the content which does not require the output gradation correction, and performs control such that the image data in the binary CMYK format is stored in the image data storage unit 33.

In addition, in a case where a half-tone image is included in the input image data, the control unit 32 determines that the content of the image data is the content which requires the output gradation correction, and performs control such that the image data in the multi-value CMYK format is stored in the image data storage unit 33.

Furthermore, in a case where a picture image or a graphic image is included in the input image data, the control unit 32 determines that the content of the image data is the content which requires the output gradation correction, and performs control such that the image data in the multi-value CMYK format is stored in the image data storage unit 33.

Meanwhile, it is possible to cause the control unit 32 not to determine whether or not the output gradation correction is required based on detailed content of the image data from the scanner 20 as described above and to cause to determine whether or not the image data, for which the output instruction is provided, requires the output gradation correction based on setting content acquired in the case where the output instruction is provided from the user.

That is, the control unit 32 performs control such that the image data in the multi-value CMYK format, which is acquired before the output gradation correction is performed, is stored in the image data storage unit 33 in a case where the setting content, which is set in the output instruction from the user, indicates that the content of the image data is the content which requires the output gradation correction, and such that the image data in the binary CMYK format is stored in the image data storage unit 33 in a case where the setting content indicates that the content of the image data is the content which does not require the output gradation correction.

Specifically, the control unit 32 performs control such that the image data in the binary CMYK format is stored in the image data storage unit 33 in a case where a manuscript type, which is set in the output instruction, is a text or a drawing, and performs control such that the image data in the multi-value CMYK format is stored in the image data storage unit 33 in a case where the manuscript type, which is set in the output instruction, is not the text or the drawing.

Subsequently, the operation of the terminal apparatus 10 in the image forming system according to the exemplary embodiment will be described in detail with reference to the drawings.

First, a first process example of switching the format of the image data to be stored using the setting content, which is set in the output instruction from the user, will be described with reference to a flowchart of FIG. 7.

First, the control unit 32 determines whether or not the image content of the image data, which is received from the scanner 20, is the blank (step S101).

Furthermore, in a case where it is determined that the content of the image data is the blank (yes in step S101), the control unit 32 causes the color conversion unit 34 to perform the color conversion process (step S103) and causes the screen processing unit 36 to perform the screen process (step S104) with respect to the received image data, and performs a process for storing the acquired image data in the binary CMYK format (binary data) in the image data storage unit 33 (step S105).

Furthermore, in a case where it is determined that the content of the image data is not the blank (no in step S101), the control unit 32 determines whether the manuscript type, which is selected in the case where the output instruction is provided, is the text, the drawing, or another else (step S102). Furthermore, in a case where the selected manuscript type is the text or the drawing (yes in step S102), the control unit 32 causes the color conversion unit 34 to perform the color conversion process (step S103) and causes the screen processing unit 36 to perform the screen process (step S104) with respect to the received image data, and performs the process for storing the acquired image data in the binary CMYK format (binary data) in the image data storage unit 33 (step S105), in the same manner as above.

Furthermore, in a case where the selected manuscript type is not the text or the drawing (no in step S102), the control unit 32 causes the color conversion unit 34 to perform only the color conversion process (step S106) with respect to the received image data, and performs the process for storing the acquired image data in the multi-value CMYK format (multi-value data) in the image data storage unit 33 (step S107).

Subsequently, a second process example of switching the format of the image data to be stored by performing a text separation process, which is a process for separating the text area from the other areas, with respect to the image content of the image data from the scanner 20 will be described with reference to a flowchart of FIG. 8.

Figure 7:
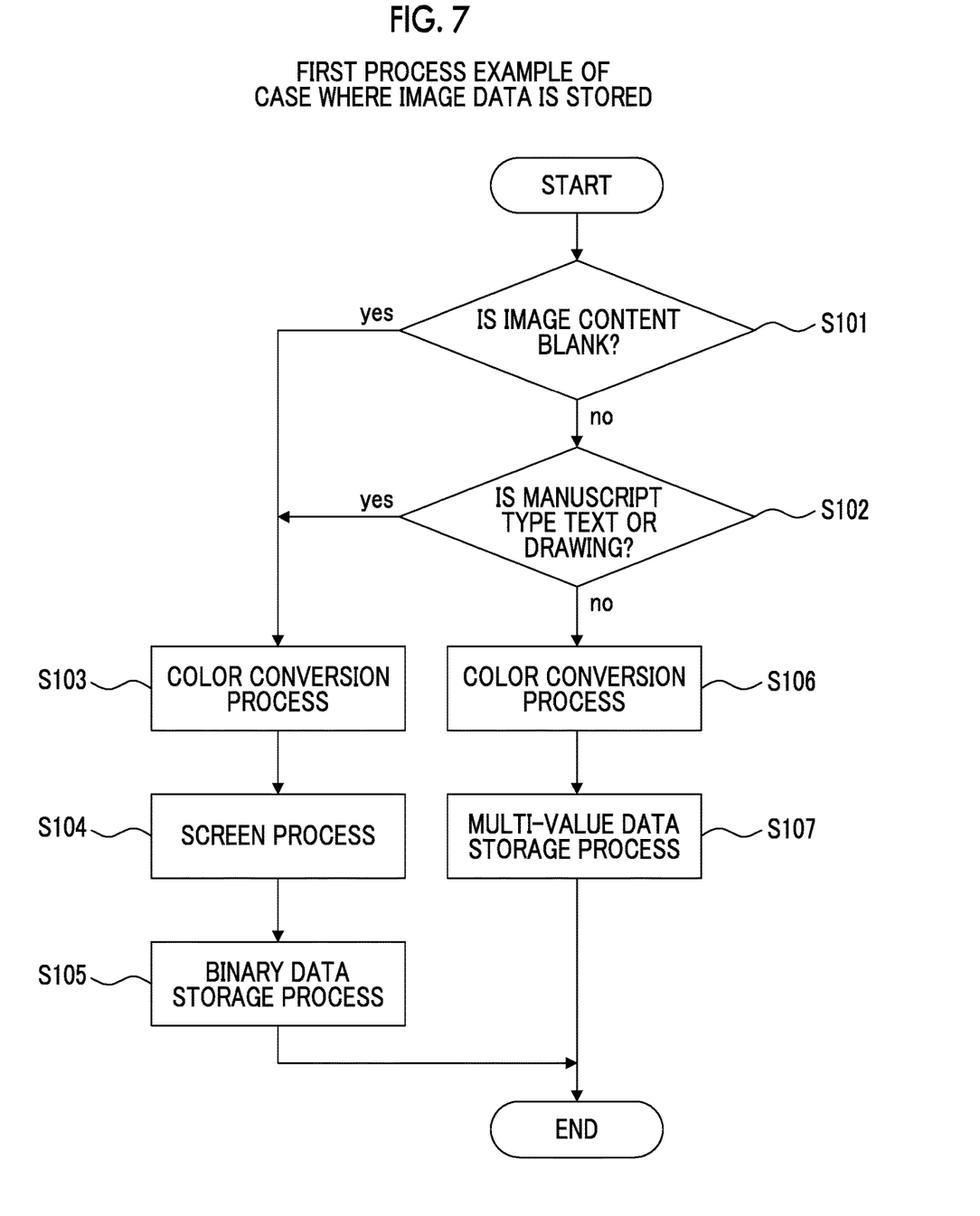
FIG. 7 is a flowchart illustrating a first process example of switching a format of image data to be stored using setting content which is set in an output instruction from a user.
Figure 8:
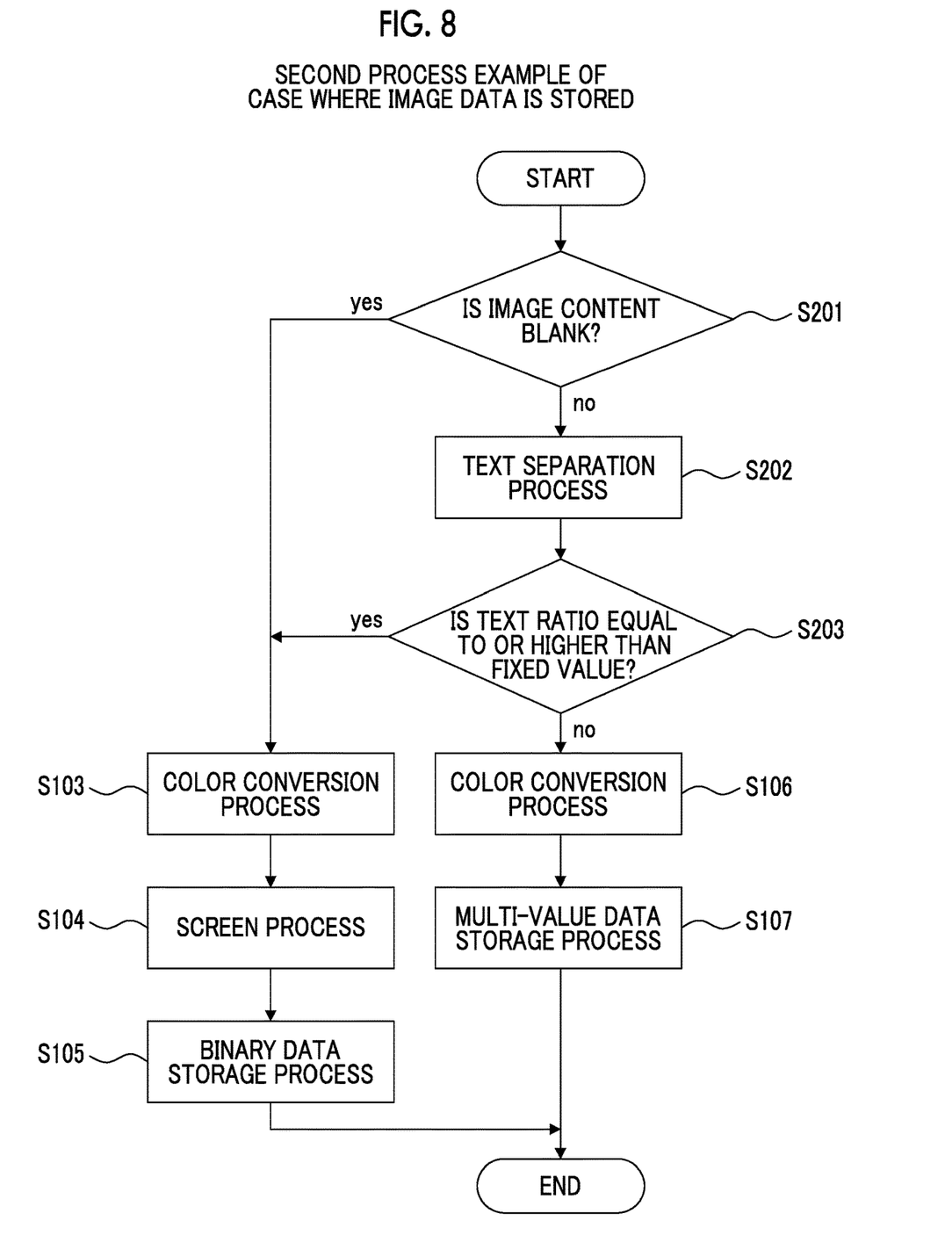
FIG. 8 is a flowchart illustrating a second process example of switching the format of the image data to be stored by performing a text separation process which is a process for separating a text area from the other areas with respect to image content of the image data from the scanner 20.

Meanwhile, since processes in steps S103 to S107 in the flowchart of FIG. 8 are identical to the processes of the flowchart of FIG. 7, the processes are described using the same reference symbols.

First, in the same manner as in the flowchart of FIG. 7, the control unit 32 determines whether or not the image content of the image data received from the scanner 20 is the blank (step S201).

Furthermore, in a case where it is determined that the content of the image data is the blank (yes in step S201), the control unit 32 causes the color conversion unit 34 to perform the color conversion process (step S103) and causes the screen processing unit 36 to perform the screen process (step S104) with respect to the received image data, and performs the process for storing the acquired image data in the binary CMYK format (binary data) in the image data storage unit 33 (step S105).

Furthermore, in a case where it is determined that the content of the image data is not the blank (no in step S201), the control unit 32 performs the text separation process with respect to the image data (step S202).

Furthermore, the control unit 32 determines whether or not a ratio of the text area to the whole image in the image data is equal to or larger than a fixed value (step S203). For example, the control unit 32 determines whether or not the ratio of the text area to the whole image in the image data is equal to or larger than 90%.

Furthermore, in a case where the ratio of the text area to the whole image in the image data is equal to or larger than the fixed value (yes in step S203), the control unit 32 causes the color conversion unit 34 to perform the color conversion process (step S103) and causes the screen processing unit 36 to perform the screen process (step S104) with respect to the received image data, and performs the process for storing the acquired image data in the binary CMYK format (binary data) in the image data storage unit 33 (step S105), in the same manner as above.

Furthermore, in a case where the ratio of the text area to the whole image in the image data is not equal to or larger than the fixed value (no in step S203), the control unit 32 causes the color conversion unit 34 to perform only the color conversion process (step S106) with respect to the received image data, and performs the process for storing the acquired image data in the multi-value CMYK format (multi-value data) in the image data storage unit 33 (step S107).

Figure 9:
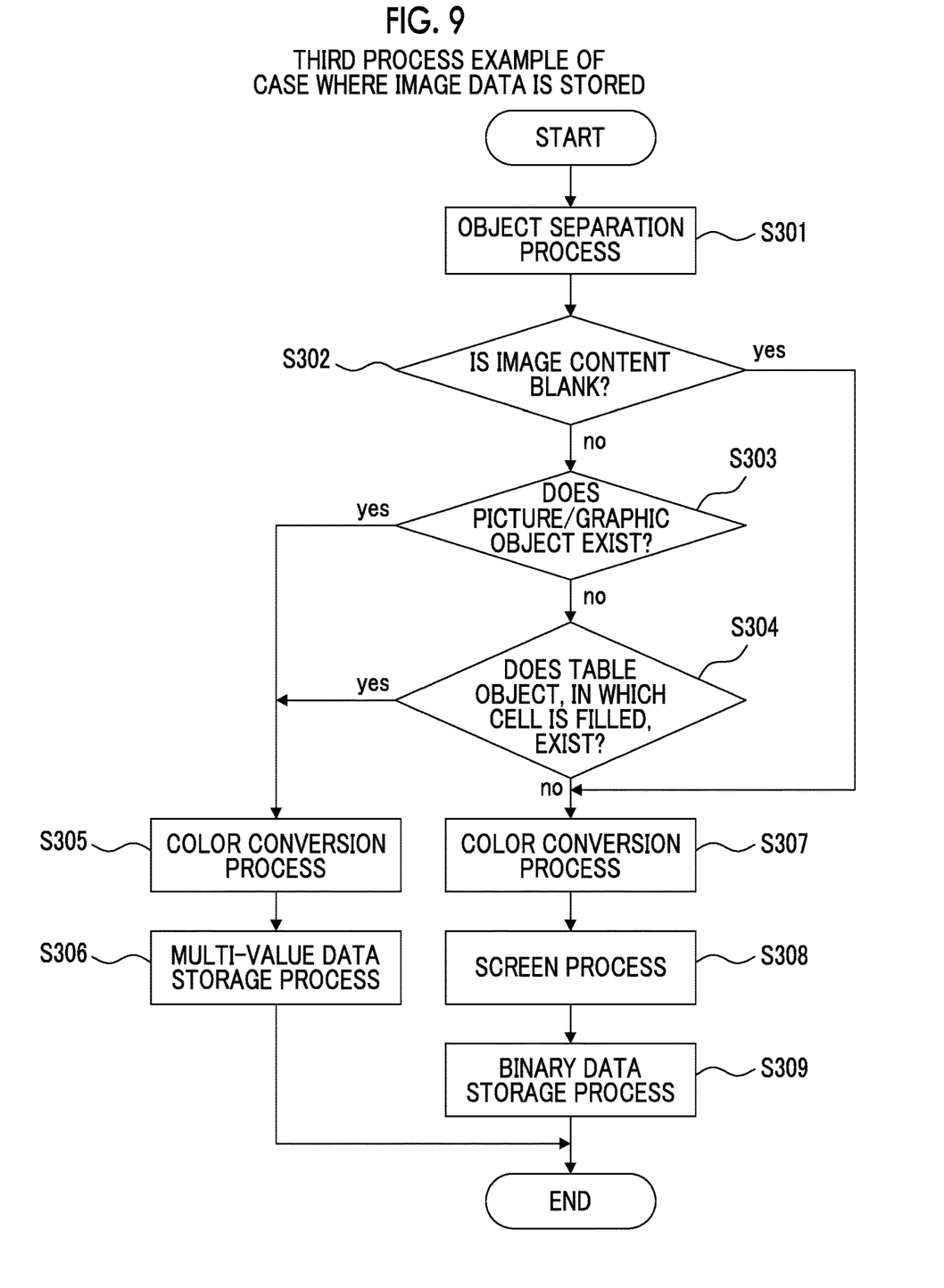
FIG. 9 is a flowchart illustrating a third process example of switching the format of the image data to be stored by performing an object separation process for separating each object included in the image for each type with respect to the image content of the image data from the scanner 20.

Subsequently, a third process example of switching the format of the image data to be stored by performing an object separation process for separating each object included in the image for each type with respect to the image content of the image data from the scanner 20 will be described with reference to a flowchart of FIG. 9.

First, the control unit 32 performs the object separation process with respect to the image data received from the scanner 20, and separates each object included in the image (step S301).

Furthermore, it is determined whether or not the image content of the image data is the blank (step S302). In a case where it is determined that the content of the image data is the blank (yes in step S302), the control unit 32 causes the color conversion unit 34 to perform the color conversion process (step S307) and causes the screen processing unit 36 to perform the screen process (step S308) with respect to the received image data, and performs the process for storing the acquired image data in the binary CMYK format (binary data) in the image data storage unit 33 (step S309).

Furthermore, in a case where it is determined that the content of the image data is not the blank (no in step S302), the control unit 32 determines whether or not a picture or a graphic object is included in the content of the image data (step S303) and whether or not a table object, in which a cell is filled, exists (step S304).

Furthermore, in the case where the picture or the graphic object is included in the content of the image data (yes in step S303) or in the case where the table object, in which the cell is filled, exists (yes in step S304), the control unit 32 causes the color conversion unit 34 to perform only the color conversion process (step S305) with respect to the received image data, and performs the process for storing the acquired image data in the multi-value CMYK format (multi-value data) in the image data storage unit 33 (step S306).

In addition, in a case where the picture or the graphic object is not included in the content of the image data (no in step S303) and in a case where the table object, in which the cell is filled, does not exist (no in step S304), the control unit 32 causes the color conversion unit 34 to perform the color conversion process (step S307) and causes the screen processing unit 36 to perform the screen process (step S308) with respect to the received image data, and performs the process for storing the acquired image data in the binary CMYK format (binary data) in the image data storage unit 33 (step S309). Here, the table object, in which the cell is filled, is an object, in which the half-tone area exists, because the cell is filled.

Figure 10:
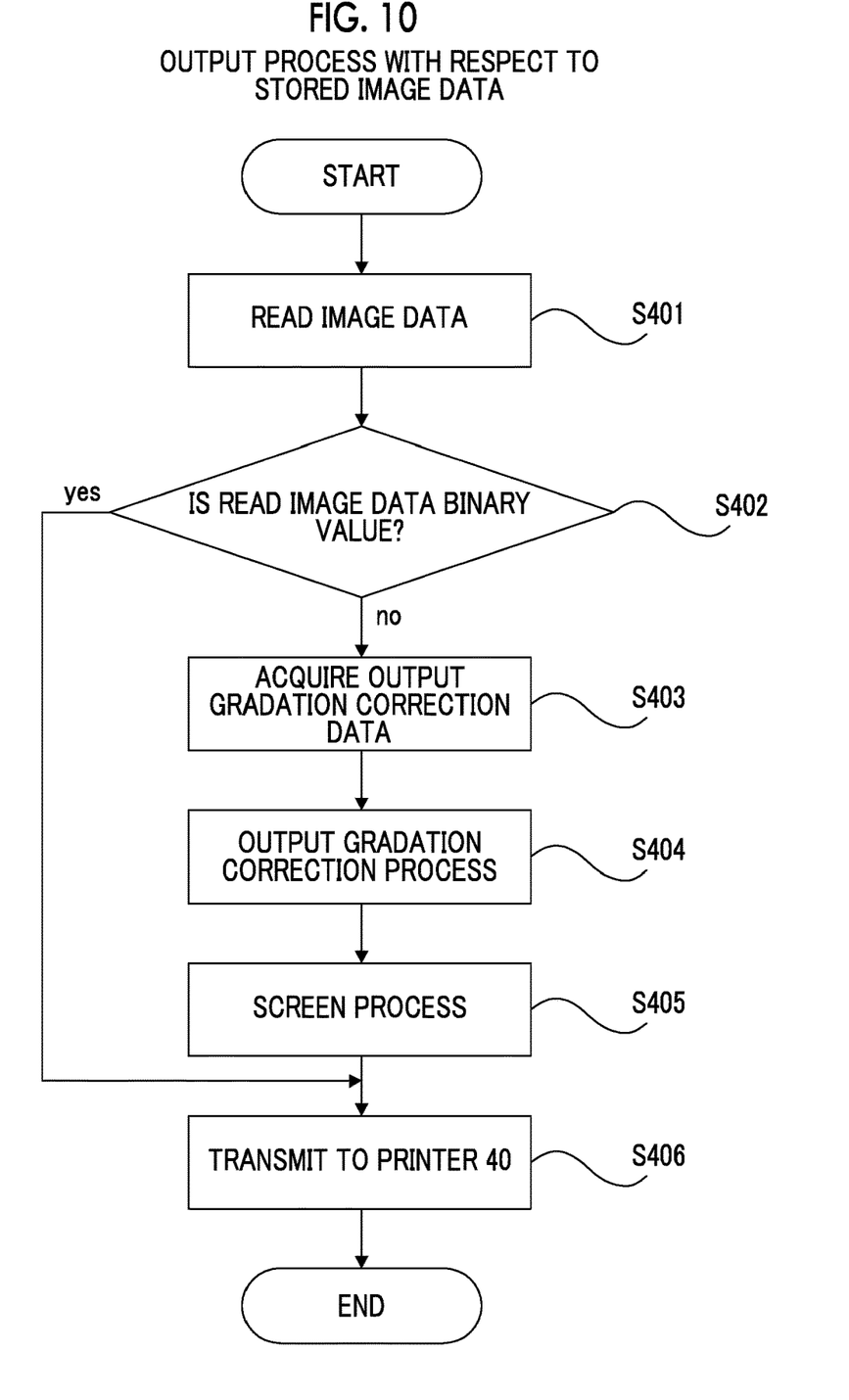
FIG. 10 is a flowchart illustrating an output process with respect to the image data stored in an image data storage unit 33.

Finally, an output process with respect to the image data, which is stored in the image data storage unit 33, will be described with reference to a flowchart of FIG. 10.

In a case where the output instruction with respect to the image data, which is stored in the image data storage unit 33, is provided, the control unit 32 reads the image data, for which the output instruction is provided, from the image data storage unit 33 (step S401).

Furthermore, the control unit 32 determines whether the read image data is the binary image data or the multi-value image data (step S402).

In a case where the read image data is the binary image data (yes in step S402), the control unit 32 transmits the read binary image data from the transmission unit 37 to the printer 40 (step S406).

Furthermore, in a case where the read image data is not the binary image data, that is, the multi-value image data (no in step S402), the control unit 32 acquires the output gradation correction data from the printer 40 (step S403), and performs the output gradation correction process with respect to the read multi-value image data using the acquired output gradation correction data (step S404).

Thereafter, the control unit 32 causes the screen processing unit 36 to perform the screen process with respect to the multi-value image data after performing the output gradation correction process (step S405), and transmits the acquired binary image data from the transmission unit 37 to the printer 40 (step S406).

MODIFICATION EXAMPLE

In the exemplary embodiment, the case where the scanner 20 which is the image reading device that reads an image, the terminal apparatus 10 that performs the image processing, and the printer 40 which is the output device that performs the output process are separate devices, respectively, is described. However, the present invention is not limited thereto, and it is possible to apply the present invention to a case of an apparatus, in which an image reading unit, an image processing unit, an image output unit, and the like are configured in one apparatus, in the same manner.

For example, in an apparatus, so-called a multifunction printer, which is capable of performing a plurality of functions, such as a printing function, a scanning function, a copying function, and a faxing function, it is possible to switch whether to store the read image data in the multi-value format or in the binary format using a method as described above.

In addition, in the multifunction printer, it is possible to cause the format of the image data to be stored to be not switched in a case where the processing speed of the image processing in the multifunction printer is higher than a previously set value, and to cause the format of the image data to be stored to be switched in a case where the processing speed of the image processing in the multifunction printer is lower than the previously set value.

In addition, in a case where, for example, an external apparatus, which performs the image processing through USB connection or the like, is connected to the multifunction printer, it is possible to switch whether to store the read image data in the multi-value format or in the binary format according to the processing speed of the image processing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor, configured to:
perform output gradation correction with respect to input multi-value image data; and
convert the multi-value image data, which is acquired after the output gradation correction is performed by the processor, into binary image data; and
a storage device electrically connected to the processor and configured to store the multi-value image data or the binary image data,
wherein the processor performs control such that the multi-value image data, which is acquired before the output gradation correction is performed, is stored in the storage device in a case where content of the input image data is content which requires the output gradation correction, and such that the binary image data is stored in the storage device in a case where the content of the input image data is content which does not require the output gradation correction.

2. The image processing apparatus according to claim 1, wherein the processor performs control such that the binary image data is stored in the storage device in a case where a ratio of a half-tone area to the input image data is smaller than a preset ratio.

3. The image processing apparatus according to claim 2, wherein the processor performs control such that the binary image data is stored in the storage device section in a case where a ratio of a text area to the input image data is larger than a preset ratio.

4. The image processing apparatus according to claim 2, wherein the processor performs control such that the binary image data is stored in the storage device in a case where the content of the input image data is blank.

5. The image processing apparatus according to claim 1, wherein the processor performs control such that the multi-value image data is stored in the storage device in a case where a half-tone image is included in the input image data.

6. The image processing apparatus according to claim 5, wherein the processor performs control such that the multi-value image data is stored in the storage device in a case where a picture image or a graphic image is included in the input image data.

7. An image processing apparatus comprising:
a processor, configured to:
perform output gradation correction with respect to input multi-value image data; and
convert the multi-value image data, which is acquired after the output gradation correction is performed by the processor, into binary image data; and
a storage device, electrically connected to the processor and configured to store the multi-value image data or the binary image data,
wherein the processor performs control such that the multi-value image data, which is acquired before the output gradation correction is performed, is stored in the storage device in a case where setting content, which is set in an output instruction from a user, indicates that content of the image data is content which requires the output gradation correction, and such that the binary image data is stored in the storage device in a case where the setting content indicates that the content of the image data is content which does not require the output gradation correction.

8. The image processing apparatus according to claim 7, wherein the processor performs control such that the binary image data is stored in the storage device in a case where a manuscript type, which is set in the output instruction, is a text or a drawing.

9. A non-transitory computer readable medium storing a program causing a computer to perform a process, the process comprising:
performing output gradation correction with respect to input multi-value image data;
converting the multi-value image data, which is acquired after the output gradation correction is performed, into binary image data; and
performing control such that the multi-value image data, which is acquired before the output gradation correction is performed, is stored in a storage section in a case where content of the input image data is content which requires the output gradation correction, and such that the binary image data is stored in the storage section in a case where the content of the input image data is content which does not require the output gradation correction.

* * * * *